United States Patent Office
3,445,448
Patented May 20, 1969

3,445,448
METHODS FOR PRODUCING GLUES AND/OR
GELATINS AND PROTEIN AND PHOSPHATE
RICH RESIDUES
Joseph P. McCann, Roselle Park, N.J., assignor to The
Theobald Industries, Kearny, N.J., a corporation of
New Jersey
No Drawing. Filed Apr. 14, 1967, Ser. No. 630,846
Int. Cl. C09h 3/00, 7/00
U.S. Cl. 260—118
12 Claims

ABSTRACT OF THE DISCLOSURE

Method for producing glue or gelatin and useful residues by soaking to plumped weight (measuring three (3) times) mixtures consisting essentially of collagen containing sponge bone and non-bone animal material in the ratio of 1 to 1–4 in aqueous HCl (conc. 1.5–5%); increasing pH to 3.0–4. Treating with $SO_2$ (at least .2 part per 100 parts of original material) then heating mass in water to recover glue or gelatin and also water-insoluble protein-and-phosphate-rich residue.

Cross-reference to related applications

Reference made to Harry A. Theobald et al. #571,920 of Aug. 11, 1966, issued as Patent 3,398,677.

Background of the invention

Production of glue and/or gelatin and useful residue. This invention is directed to novel methods for treating certain animal materials and also to novel compositions produceable thereby. In one of its more specific aspects the invention is directed to novel methods for treating combinations of certain bone and non-bone animal materials and also to novel glues and/or gelatins and also novel protein and mineral rich compositions produced thereby.

Prior to this invention others proposed various methods for treating collagen-containing bone or solid non-bone fraction other than fat of animal materials for the production of glue or gelatin. The bone fraction has a bulk density generally in excess of 50 pounds per cubic foot and consists mainly of dense, heavy bone pieces, known to the art as "hard" bone together with minor amounts of spongy-appearing, light weight bone pieces, known to the art as "sponge" bone. The collagen-containing non-bone fraction other than fat, water and/or water-soluble components comprise cartilage, connecting tissue, hides, skins, membranes, intestines, etc. The common method for treating said bone fraction involves acid treating for long periods, generally about five (5) days to obtain demineralized bone known to the art as ossein. Then the ossein is subjected to washing, liming followed by further washing and souring to condition it for the production of glue and/or gelatin. Usually this entire process requires from 5 to 10 weeks.

Heretofore it was found economically unsound to treat combinations of said bone fraction and non-bone fraction wherein the latter is present in amount by weight at least equal to the weight of the former. This I believe is due to a number of factors, among which are: due to the concentration of the acid being maintained throughout the acid treatment for such long periods of time, much of the collagen component of the non-bone fraction affected thereby is lost in the subsequent washing and liming steps and in addition some of the matrix of the "sponge" bone component is softened and lost and due to the severe action to which the sponge bone ossein is subjected by the liming process together with daily agitation over a 5–10 week period, there is also considerable loss of the sponge bone ossein compared with that on normal hard bone ossein.

Starting materials preferably used

I have discovered that by employing that part of the bone fraction composed mainly of "sponge" bone and having a bulk density no greater than about 42 pounds per cubic foot, mixtures of the non-bone fraction therewith in the proportion of 1 of said part of the bone fraction to 1–4 of the non-bone fraction are eminently suitable economically for producing glues and/or gelatins and at the same time other useful products are all recoverable. Such mixtures represent the materials treated in accordance with this invention and one of the features of the invention.

According to this invention by employing said mixtures as before set forth, improved glues and/or gelatins and certain by-products are produced in a relatively short time and economically feasible manner.

The preferred normally solid animal material employed in the practice of this invention and hereinafter referred to as Material I herein has a fat content in the range of 0–20% (both inclusive) by weight and has a bulk density on a 10% by weight moisture content basis no greater than about 42 and preferably no greater than about 40 pounds per cubic foot and is further characterized as comprising a mixture of (a) pieces of collagen containing bone having a fat content in the range of 0 to about 15% (both inclusive) by weight and on a 10% by weight moisture content basis having a bulk density no greater than about 42 and preferably no greater than about 40 pounds per cubic foot and (b) pieces of collagen containing non-bone animal material having a fat content in the range of 0 to about 25% (both inclusive) by weight and on a 10% moisture content basis having a bulk density no greater than about 40 pounds per cubic foot, the ratio by weight of (b) to (a) being in the range of about 1–1 to about 4–1.

Various methods may be employed for the production of said Material I. One method which may be used is to produce separately masses of (a) and (b) and subsequently combine them in the proportions before described. For example "India bone" may be comminuted to the desired size and that portion thereof consisting essentially of (a) is separated from the remainder; and (b) a mass consisting essentially of non-bone collagen containing animal material as aforedescribed is combined with (a) in the proportions described. The component (b) may be produced by rendering under low temperature conditions hides, skins, offal, flesh, etc. containing cartilage, connecting tissue, etc. to provide a rendered stock wherein practically all collagen originally therein has been retained. Instead of preparing (a) and (b) separately and then combining them in the proportions aforedescribed, mixtures of bone and non-bone animal materials containing collagen may be rendered in the manner described in the U.S. patent application of Harry A. Theobald et al., Ser. No. 571,920 of Aug. 11, 1966, issued as Patent 3,398,677 and by reference is made part hereof. In part said method in one of its specific aspects comprises: in a continuous operation reducing animal material to be rendered and including bones measuring at least 10% by weight thereof to such size that at least 70% by weight thereof is in the range of ¼″–1½″, and at least 20% by weight of the bones are in the range of ⁵⁄₁₆″–¾″; then heating said material in a range of about 170°–215° F. and maintaining the water content thereof at a level which is greater than 60% of that originally in said material and the fat content thereof which is at a level greater than 35% of that originally in said material; screening said material in said temperature range to drain off some of the fat and water therefrom; then while in said temperature range and measuring at least 40% by weight of said material after said size reduction and containing fat measuring at least 15% by weight thereof and at least 35% by weight of that originally in said material and water measuring at least as great as said fat and at least 60% and less than 100% of that originally in said material, subjecting said partially fat and water depleted material to increasing pressures in a continuously operating screw press to express fat and water therefrom until a residue is obtained and discharged therefrom and has a fat content measuring no greater than about 10% by weight on the dry basis; the residence time of said material in said temperature range being less than that required to denature 10% by weight of the ossein in said bones in the range of 5/16"–3/4", and the resulting solids are dried.

Said dry solids, containing small amounts of fat and moisture, are subjected to a screening classification operation from which are recovered two fractions, the major fraction being those pieces measuring less than 3/4" and a minor fraction being pieces greater than 3/4". The major fraction is then subjected to further screening classification whereby the fines measuring less than about 10 mesh are separated and the oversized pieces are collected for further processing. These oversized pieces are then subjected to an air separation procedure wherein the hard bone fraction is separated from the remainder which consists essentially of (a) herein described and (b) herein described. This mixture of (a) and (b) so recovered is one example of Material I before described and those embodiments thereof identified as X, Y and Z in the table set forth below are specific examples of said Material I. If desired the fraction which passed over said first mentioned screen may be comminuted so that it passes through a 3/4" screen and this material may be fed back to the original dried solids for processing as before described.

The material recovered has a fat content measuring about 5–10% by weight thereof and a moisture content measuring about 5–10% by weight thereof. At least 90% by weight of said material passes through a 3/4" mesh screen and is retained on a 10 mesh screen and at least 75% thereof is retained on a 5/16" mesh screen. Said material has a bulk density no greater than 42 pounds per cubic foot and in the particular runs which were made 3 of those materials had a bulk density of less than 40 pounds per cubic foot. The following are examples of some of said Materials I recovered, the other characteristics of which are set forth in the following table, with X, Y and Z being examples of Material I:

| Material I | Bulk Density I | Percent (a) | Percent (b) | Bulk Density (a) | Bulk Density (b) |
|---|---|---|---|---|---|
| X | 34.9 | 40 | 60 | 37.2 | 33.8 |
| Y | 33.8 | 42 | 58 | 36.5 | 31.8 |
| Z | 35.8 | 42.2 | 57.8 | 38.2 | 34 |

Summary of the invention

According to this invention a quantity of Material I is charged into a glass lined vessel after which there is added thereto a sufficient quantity of aqueous HCl to completely cover Material I therein. An amount of said aqueous HCl measuring about four times the weight of the Material I therein has been found suitable. The aqueous solution of HCl added preferably has a concentration in the range of about 1.5 to about 5% HCl, and for best yields that concentration need not be greater than 3% and for optimum acid economy and yields about 2% concentration is preferred. The mixture of Material I and the aqueous HCl has an initial pH of approximately 1/2. This mixture need not be heated and consequently is allowed to remain and thereby soak at room temperature at least until plumping has occurred as evidenced by swelling of Material I to a wet-weight measuring at least two and preferably at least three times that of original Material I. I have found that when the HCl concentration of the aqueous hydrochloric acid employed was about 2%, that a residence time in the range of approximately 18–40 hours was sufficient. Over that period, fat rose to the top of the liquid and was skimmed off, bubbling occurred due to the calcium carbonate thereof and especially of the (a) portion therein having reacted with the HCl and the (b) portion therein swelled or plumped so that at the end of that period the Material I so treated had a wet weight at least about three times the weight of original Material I. At this stage most of the HCl has been consumed and the pH of the mix is approximately 2.5. Then the pH of the "solids" represented by said so treated Material I therein was adjusted to a value in the range of about 3 to 4 and optimumly approximately 3½. This is effected preferably by water washing. For the purposes of economy, it is preferable that after said plumping period, the liquid phase of the mix be drawn off and collected. This liquid contains inorganic solutes and is now treated with lime ($CaO_2$) whereby calcium phosphates are precipitated out and recovered as a useful by-product composition of matter. The swelled mass remaining after said liquid phase has been drawn off is now subjected to said water washing to obtain a mixture of said previously treated Material I in water, with the pH of the mix being as before set forth. The amount of water now in said mix may vary over a wide range but it is preferred that at least an equal part by weight thereof per part of said so treated Material I be used.

To the mix is now added sufficient sulphur dioxide or any donor or combination of donors of sulphur dioxide to provide said mix with at least 0.2 part and preferably more than 0.2 and at least 0.4 parts by weight of sulphur dioxide per 100 parts of weight of the Material I originally employed. For optimum yields I prefer that an excess of sulphur dioxide be present in said mix and therefore use at least about .6 part. In practice, about .6 to about .9 part of $SO_2$ based upon 100 parts of original Material I is employed, although more may be used, but excess over 0.9 would merely add to the cost. One of the suitable donors which is preferably employed is sodium meta bisulphite ($Na_2S_2O_5$) present in amount to yield about ½ to 1 part $SO_2$ per 100 parts of original Material I; 2.5 pounds thereof per each 100 pounds of original Material I has been found suitable. In any case, the mix containing the sulphur dioxide is permitted to remain at room temperature for about 1–3 hours, generally no more than 2 hours being sufficient, to assure the combining of sulphur dioxide in a manner not known to me, with the treated Material I therein. At the end of this period essentially all (more than 90%) of the so treated solids have maintained their physical integrity. Then the water phase containing the excess sulphur dioxide was drawn off and the remaining "solids" or stock was washed with water two or more times with an equal weight of water. The so-washed solids or stock was transferred to a cooking vessel containing a quantity of water therein. A quantity of water measuring about 2 times the weight of the original Material I employed was found suitable. This mix was cooked in said open vessel at glue liberating temperature of 212° F. for 1 hour after which the aqueous phase was removed from the solids phase and was a solution of glue measuring between 18–24% of the weight of the original Material I. Then a quantity of water whose weight was the same as that of the remaining wet solids was charged into the vessel and the mix cooked therein for 1 hour at 212° F. Then the liquid phase was removed and contained glue measuring between about 6–12% of the weight of the original Material I. When these two solutions were treated in the conventional manner of filtering, evaporating, casting into gel molds and air drying the resultant glues were found to contain some $SO_2$. Most of it was removed by ion-exchange treatment between the filtering and evaporating steps. The glues so produced and recovered and containing about 10% by weight of moisture measured about 24–30% of the original Material I by weight and required only a two-step boiling procedure of only one hour each. The glue of the first cut had 350–500 jelly gram strength, and that of the second cut had 150–300 jelly gram strength. These glues when in flake form had a light golden appearance.

Instead of producing glues the mix, instead of being heated to 212° F., it is now heated to about 160° F. and its temperature lowered at uniform rate to 140° F. over a 4 hour period. The liquid phase is drawn off and consists of an aqueous solution of gelatin. The remaining solids are covered with water and this mix is heated to 180° F. and its temperature gradually lowered to 160° F. over a 2-hour period. The liquid phase is drawn off. The remaining solids are covered with water and this mix is cooked at 212° F. for 1 hour. The aqueous phase is drawn off.

These three aqueous phases are now treated in the same manner as were the glue solutions to obtain three dried gelatin fractions having a moisture content of approximately 10%. The gelatin from the first cut measured 12–15% of original Material I and had a bloom strength of 225–275 and a viscosity of 28–35 millipoises; that from the second cut measured 4–6% of original Material I and had a bloom strength of 130–170 and a viscosity of 25–30 millipoises; and that from the third cut measured 2–5% of original Material I and had a bloom strength of 50–75 and a viscosity of 20–25 millipoises. The total weight of gelatin is 18–31% of original Material I.

The residues were recovered and air dried after the glues and gelatins were produced. They measured about 35–40% of original Material I by weight. In each case the residue is ground to 20 mesh size and useful by-products in the field of animal feed and/or fertilizer due to their high protein and phosphate content.

Description of the preferred embodiment

The following is an example, given by way of illustration and not limitation, of a specific method of the present invention and some of the products produced thereby, all parts given in the description and claims being by weight unless otherwise specified.

Twenty pounds of X, an embodiment of Material I defined in the table, is charged into a shallow soaking vessel. In this instance at least 90% of X passes through a ¾" screen and is retained on a 10 mesh screen, and at least 75% is retained on 5/16" mesh screen. Then 80 pounds of aqueous hydrochloric acid (concentration 2% HCl) is charged into said vessel whereby the Material X is substantially completely wetted thereby and is covered thereby. This mixture is permitted to remain in said vessel for about 20 hours at room temperature. At the end of which time it was found that Material X had been plumped and had a wet weight measuring more than three times that of original Material X, and the pH of the liquid phase was measured and found to be about 2.5 indicating that the acid was considered as "spent." At this stage fat had risen to the top of the liquid and was skimmed off. Then the liquid phase was removed, collected and treated with lime whereby calcium phosphates are precipitated out and recovered as useful by-product compositions of matter.

The swelled mass remaining after said liquid phase is removed, is now washed with water until the pH on the water phase covering same is increased to a value between approximately 3.3 and 3.6. Then to this mix is added about ½ pound of sodium bisulphite ($Na_2S_2O_5$) with some stirring thereby to provide sufficient $SO_2$ donor capable of supplying 0.85 part $SO_2$ per 100 parts of original Material X therein. Said mass is permitted to remain in said vessel for a period of about two hours. Then the water phase thereof containing excess sulphur dioxide and/or said sodium bisulphite is drained off and the resultant mass or stock is rinsed twice with an equal weight of water. Practically all of this stock at this stage has maintained its physical integrity and physically differs from the original stock in one essential manner, namely, in that it is swelled. The so-washed stock is transferred to a cooking vessel containing an amount of water equal to two times the weight thereof. This mass was cooked in said open vessel at 100° C. for one hour after which the aqueous phase was separated from the solid phase and recovered and contained glue measuring 4.8 pounds. Then an equal weight of water was added to the remaining solids and this mass was cooked as before for one hour at the same temperature as before. Again, the liquid phase was separated therefrom and recovered and contained glue measuring 1.2 pounds. These two solutions were treated by filtration, ion-exchange, evaporation, etc. whereby improved glues were recovered. The residue from the cooking vessel was air dried whereby solid calcium phosphate and water and dilute-HCl insoluble protein rich composition was obtained. This composition was comminuted and finds utility in animal feeds and/or fertilizers.

The total amount of glue recovered is about 6 pounds and the amount of said solid residue recovered is about 8.4 pounds. The total time required for carrying out the aforesaid process is not in excess of two days.

Instead of heating to 100° C. for the production of glues, the general method heretofore described for the production of gelatins was used and three gelatin cuts were recovered which respectively weighed 2.96, 1.24 and 1.0 pounds which together represent a 26% yield.

The stock after treatment with the $SO_2$ for at least 1 hour and preferably for 2 hours in this embodiment and followed by the draining and subsequent water washings contained $SO_2$ combined in some manner therewith as not to be removable by said washings. This is evidenced by the presence of $SO_2$ or some other sulphur containing complex or compound in the glue and gelatin cuts obtained in the absence of the ion-exchange treatment between the filtration and evaporating steps indicating that the $SO_2$ has been strongly absorbed, adsorbed or chemisorbed or chemically reacted with the collagen fraction of the plumped original material. Such glue and gelatin cuts contain about 1,500 to about 5,000 parts of $SO_2$ per million thereof on a weight basis. By employing said ion-exchange treatment between the filtering and evaporating steps the $SO_2$ content of the glue and gelatin produced is reduced to 0–200 parts per million parts by weight of the glue and gelatin.

Since certain changes may be made in carrying out the above process without departing from the scope of the invention, it is intended that all matter contained in the above description shall be interpreted as illustrative and not in a limiting sense.

It is to be understood that the following claims are intended to cover all the generic and specific features of the invention herein described, and all statements of the scope of the invention, which as a matter of language might be said to fall therebetween.

I claim:

1. A process comprising:
   in (1) aqueous hydrochloric acid, whose concentration is about 1.5 to 5% HCl, soaking (2) solid animal material, said material having a bulk density of less than 42 pounds per cubic foot on a 10% by weight moisture content basis and comprising a mixture of (a) pieces of bone containing collagen, having a fat content of 0–15% (both inclusive) by weight and on a 10% by weight moisture content basis having a bulk density no greater than 42 pounds per cubic foot and (b) pieces of non-bone containing collagen, having a fat content of 0–25% (both inclusive) by weight and on a 10% by weight moisture content basis having a bulk density no greater than about 40 pounds per cubic foot, the ratio by weight of (b) to (a) being in the range of about 1–1 to about 4–1, said material being of such size that 90% by weight passes through a ¾″ mesh screen and is retained on a 10″ mesh screen and at least 75% by weight is retained on a 5⁄16″ mesh screen; said soaking continued at least until said material has been plumped to a wet-weight which measures at least twice its original weight, the time of said soaking being in the range of approximately 18–40 hours; washing said so-treated material, having a wet weight at least twice its original weight, with water to increase the pH thereof to a value in the range of about 3 to about 4;

soaking the resultant material in an aqueous medium containing at least .2 part by weight of sulphur dioxide based upon 100 parts by weight of said original material for combining sulphur dioxide with said resultant material;

and heating said sulphur-dioxide-containing material in water at elevated temperature until gelatin or glue is produced and dissolved in said aqueous medium; the time of soaking said resultant material in said aqueous medium containing said sulphur dioxide being sufficient that said glue or gelatin produced has an $SO_2$ content by weight of about 1500 to about 5000 parts per million which is not removable therefrom by water washing.

2. A process according to claim 1, separating said aqueous solution of gelatin or glue from the undissolved solids in said last mentioned aqueous medium, then drying and comminuting said solids.

3. A process according to claim 1, said aqueous hydrochloric acid having a concentration of HCl in the range of about 1.5% to about 3%.

4. A process according to claim 1, said aqueous hydrochloric acid having a concentration of about 2%.

5. A process according to claim 3, the quantity of $SO_2$ in said aqueous medium being at least about 0.4 part based upon 100 parts of said original material.

6. A process according to claim 3, the quantity of $SO_2$ in said aqueous medium being at least about 0.6 part based upon 100 parts of said original material.

7. A process according to claim 4, said $SO_2$ being from an $SO_2$ donor present in amount sufficient to produce at least about ½ part of $SO_2$ based upon 100 parts of the original material.

8. A process according to claim 1, said $SO_2$ being from an $SO_2$ donor present in amount sufficient to produce between about ½ to about 1 part of $SO_2$ based upon 100 parts of the original material.

9. A process according to claim 7, said donor being sodium meta bisulphite.

10. A process according to claim 1, said original material being of such size that at least 90% by weight thereof passes through a ¾″ mesh screen and is retained on a 10 mesh screen and at least 75% by weight thereof is retained on a 5⁄16″ mesh screen.

11. A process according to claim 10, filtering said aqueous mass containing said glue or gelatin therein and recovering a solid residue, subjecting the filtrate to ion-exchange to reduce the $SO_2$ content thereof, removing water from said filtrate, and drying and comminuting said residue.

12. A process according to claim 1, said solid animal material produced by separating it from a residue produced by subjecting a mixture of bones and non-bone animal material containing collagen, to a temperature of about 170–215° F. and maintaining the water content at a level greater than 60% of that originally therein and the fat content at a level greater than 35% of that originally therein, separating some of the fat and water therefrom, then while in said temperature range and measuring at least 40% by weight of the original mixture and containing fat measuring at least 15% by weight thereof and at least 35% by weight of that originally in said mixture and water measuring at least as great as the fat and at least 60% and less than 100% of that originally in the mixture, subjecting the partially fat and water depleted material to increasing pressures to express water and fat therefrom until said residue is obtained and having a fat content measuring no greater than 10% by weight on a dry basis, the residence time of the material in said temperature range being less than that required to denature 10% of the ossein in the bones and drying the residue.

References Cited

UNITED STATES PATENTS

| | | | |
|---|---|---|---|
| 2,743,265 | 4/1956 | Garonoefax | 260—118 |
| 3,108,995 | 10/1963 | Tourtelloffe | 260—117 |
| 3,398,677 | 8/1968 | Theobald | 100—37 |
| 307,754 | 11/1884 | Ekman | 260—118 |
| 518,861 | 4/1894 | Schroeder | 260—118 |
| 721,852 | 3/1903 | Arens | 260—118 |
| 757,658 | 4/1904 | Hilbert | 260—118 |
| 783,784 | 2/1905 | Hewitt | 260—118 |
| 3,308,113 | 3/1967 | Johnsen et al. | 260—118 |

FOREIGN PATENTS

| | | |
|---|---|---|
| 8,010 | 1839 | Great Britain. |
| 2,175 | 1894 | Great Britain. |

OTHER REFERENCES

Chemistry and Technology of Gelatin and Glue, Bogue, 1922, pages 271–294, 300–307 and 317.

Glue and Gelatin, Alexander, 1923, pages 151–168.

Encylcopedia of Chemical Technology, vol. 10, 1966, pages 499–506, Kirk.

Dictionary of Applied Chemistry, Thorpe, vol. 5, 1941, pages 504–510, and vol. 6, 1943, pages 21–31.

WILLIAM H. SHORT, *Primary Examiner.*

H. SCHAIN, *Assistant Examiner.*

U.S. Cl. X.R.

71—20; 99—130; 260—412, 412.7